United States Patent [19]

Sjobom

[11] Patent Number: 5,896,093

[45] Date of Patent: Apr. 20, 1999

[54] L.E.D. LIGHT ASSEMBLY FOR TRAFFIC ARROWBOARDS

[76] Inventor: Fritz C. Sjobom, 1658 Monarch Ridge Cir., El Cajon, Calif. 92020

[21] Appl. No.: 09/054,695

[22] Filed: Apr. 3, 1998

[51] Int. Cl.[6] ........................................ F21V 5/00
[52] U.S. Cl. .................. 340/815.75; 340/815.45; 340/815.62; 359/624; 362/244; 362/800
[58] Field of Search .................. 340/815.75, 815.45, 340/815.56, 944, 917, 925, 815.62; 362/244, 332, 333, 339, 800; 359/624

[56] References Cited

U.S. PATENT DOCUMENTS

| | | | |
|---|---|---|---|
| 5,515,253 | 5/1996 | Sjobom | 362/244 |
| 5,692,827 | 12/1997 | Chinniah et al. | 362/336 |
| 5,765,940 | 6/1998 | Levy et al. | 362/240 |
| 5,791,759 | 8/1998 | Dassanayake et al. | 362/61 |
| 5,833,355 | 11/1998 | You et al. | 362/244 |

*Primary Examiner*—Thomas Mullen
*Assistant Examiner*—Davetta Woods
*Attorney, Agent, or Firm*—Charles C. Logan, II

[57] ABSTRACT

An L.E.D. light assembly for traffic arrowboards having an upright oriented lens having a front surface and a rear surface. A plurality of vertical flutes are formed on said rear surface and a plurality of horizontal flutes are formed on said front surface. Each of these flutes have a left edge and a right edge and when the lens is viewed from the front or rear, the respective viewable intersecting left and right edges of the vertical flutes and horizontal flutes define a grid of four-sided light magnifier modules. This grid has a central core portion of light magnifier modules and a surrounding portion of light magnifier modules. Light from the L.E.D.'s positioned behind the central core portion of light magnifier modules produces a spotlight type of beam along the longitudinal axis of the light assembly. The surrounding portion of light magnifier modules produce a divergent light pattern that is greater in the horizontal plane than in the vertical plane. The light intensity in front of the central core portion of light magnifier modules is at a minimum of 30% brighter than the intensity of the light in front of the surrounding portion of light magnifier modules.

15 Claims, 5 Drawing Sheets

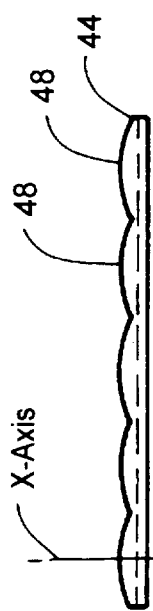
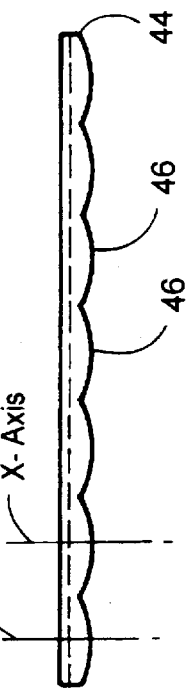
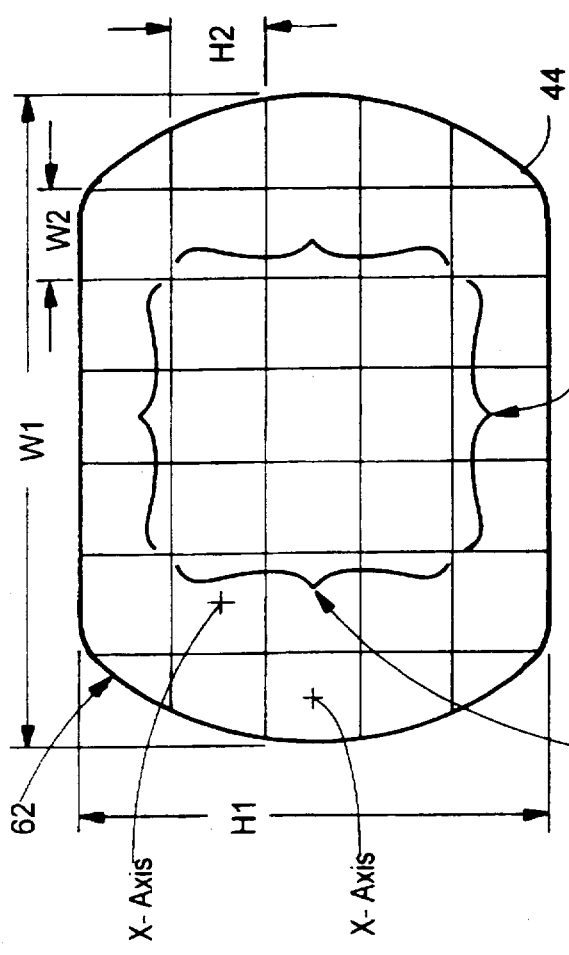
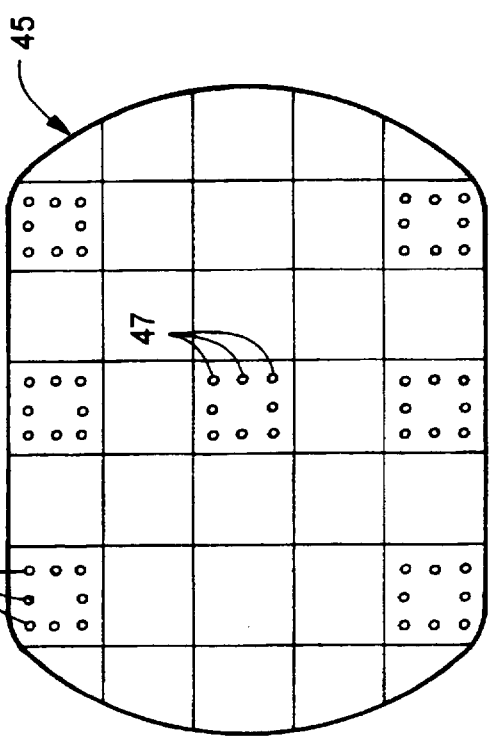

L.E.D. LIGHT ASSEMBLY FOR TRAFFIC ARROWBOARDS

BACKGROUND OF THE INVENTION

The invention relates to a light assembly having a refractive lens and more specifically one that utilizes L.E.D.'s for the source of illumination.

Typically, most light assemblies have either incandescent bulbs or halogen bulbs providing the source of illumination. These types of light sources can vary the degree of brightness depending upon the particular application for which the light assembly is used. Often these light sources require reflectors to direct most of the rays along a forward pattern. Incandescent and halogen lights are usually fairly large resulting in the light assembly having a relatively large depth to it. Additionally, incandescent and halogen bulbs require a relatively greater amount of electricity to operate them.

It is known that the use of light emitting diodes (L.E.D.'s) consume substantially less power than incandescent or halogen bulbs. However, typically, the radiant power of L.E.D.'s has been limited so that they have been used primarily for short range applications such as panel indicators or indoor signs. L.E.D.'s have proven useful when their size has not been a significant factor because they are viewable from short distances. Unfortunately, the use of L.E.D.'s in outdoor applications such as traffic lights has been limited due to the high levels of ambient light. Even with the advent of ultrabright L.E.D.'s, large clusters of L.E.D.'s are required to achieve adequate target size definition. The longer distances involved in outdoor illumination devices, the brightness of ambient light conditions, and limits of resolution of the human eye are among the factors which require clusters of large numbers of L.E.D.'s in known systems. Unfortunately, these clusters are expensive.

Another problem prevalent with the use of L.E.D.'s positioned behind a refractive lens is the fact that dark or dead spots are often produced in which no illumination is transmitted. This has been acceptable in some applications but it has resulted in limited use of L.E.D.'s as the source of illumination for outdoor signs or traffic signals.

It is an object of the invention to provide novel L.E.D. light assembly for traffic arrowboards that uses substantially less power than incandescent lightbulbs for similar applications of a light assembly.

It is also an object of the invention to provide a novel L.E.D. light assembly that has a floodlight effect as well as an ultra bright spotlight in the center.

It is another object of the invention to provide a novel L.E.D. light assembly that is economical to manufacture and market.

It is an additional object of the invention to provide a novel L.E.D. light assembly that can be used with outdoor signs and provide sufficient long range visibility thus making them acceptable to the industry.

SUMMARY OF THE INVENTION

The novel L.E.D. light assembly has been primarily designed for use with an outdoor traffic sign. A specific example would be the use of an arrowboard display panel that is set up along a road undergoing construction or having a merging traffic pattern. Often these display panels are mounted on a trailer thereby making them portable and easy to transport from one location to another. Some of these display panels are powered by a battery and/or a diesel generator. In some instances solar powered panels are used to charge the batteries.

The L.E.D. assembly has a base, a lens housing, a lens and a printed circuit board. The base, lens housing and lens may be integrally formed of a polycarbon plastic. The base has a round configuration to mate with a par 46 or par 36 base socket. The lens housing tapers from the base to the lens. The lens is generally oval shaped or rectangular and it is approximately 4½" wide and 3" high.

The lens has a rear surface having a plurality of adjacent vertical flutes each having a left edge and a right edge. The convex or concave shape of the flutes collect the light rays from the L.E.D. positioned a predetermined short distance behind them and spread the light horizontally. Pixels may be placed on the flutes to advance the optics at a close range. They will diminish the viewing range at a greater distance.

The front surface of the lens has a plurality of adjacent horizontally oriented convex or concave flutes each having a left edge and a right edge. In viewing the lens from the front or rear of the lens, the respective viewable intersecting left and right edges of the vertical flutes and the horizontal flutes define a grid of four sided light magnifier modules. The grid has a central core portion of light magnifier modules and a surrounding portion of light magnifier modules. By varying the radius', the curvatures and the thickness of the flutes, different desired light patterns can be obtained.

The radius of curvature of the vertical flutes of the central core portion of light magnifier modules is greater than the radius of curvature of the vertical flutes of the surrounding portion of light magnifier modules. As an example, the radius of curvature of the vertical flutes of the central core portion of light magnifier modules might be 0.940 inches and the radius of curvature of the vertical flutes of the surrounding portion of light magnifier modules might be 0.937 inches. The vertical flutes behind the central core portion of light magnifier modules receive light from their respective L.E.D.'s that are axially aligned on the horizontal X-axis of the respective light magnifier modules. The light received and transmitted through these central core portion of light magnifier modules is collimated and projected forwardly in a spotlight beam of light. This spotlight beam of light is generally visible up to a mile away and it has an intensity in the range of 600 to 100 candelas.

The vertical flutes of the light magnifier modules of the surrounding portion of light magnifier modules has a radius of curvature that is chosen so that it will direct the light rays from each of the respective light magnifier modules in a pattern having a width whose angulation is in the range of 0–35 degrees.

The printed circuit board is made of a fiberglass disk of the size to fit the round PAR 46 base or PAR 36 base. Varying amounts of L.E.D.'s up to 36 may be positioned behind the light magnifier modules. The circuit board will normally have a group of electronic components that will cause the lamp base to pulsate. This reduces the amount of electrical current required. The circuit board normally has two terminals to which the electrical current will be connected. The outer edge of the printed circuit board has alignment slots that coordinate with structure in the base so that the L.E.D.'s are properly located behind their light magnifier modules on the longitudinal X-axes of each of the respective light magnifier modules.

DESCRIPTION OF THE DRAWINGS

FIG. 4 is a front elevation view of the lens of the L.E.D. light assembly;

FIG. 5 is a right side elevation view of the lens illustrated in FIG. 4;

FIG. 6 is a top plan view of the lens illustrated in FIG. 4;

FIG. 7 is a front elevation view of an alternative embodiment lens having pixels formed on its rear surface on specific light magnifier modules;

FIG. 8 is a right side elevation view of the alternative embodiment lens illustrated in FIG. 7;

FIG. 9 is a top plan view of the alternative embodiment lens illustrated in FIG. 7;

DESCRIPTION OF THE PREFERRED EMBODIMENT

The novel L.E.D. light assembly will now be described by referring to FIGS. 1–15 of the drawings. The L.E.D. light assembly is generally designated numeral 20.

Figure 1:
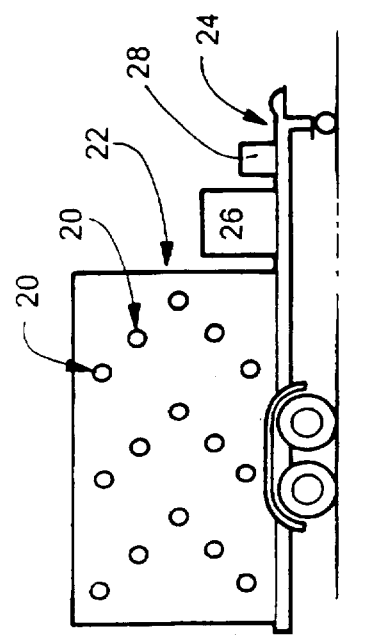
FIG. 1 is a schematic side elevation view showing a plurality of L.E.D. light assemblies installed in an outdoor sign mounted on a trailer.
Figure 2:
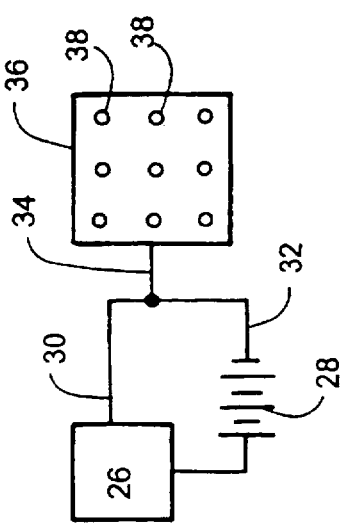
FIG. 2 is a schematic diagram showing the electrical circuit of the outdoor sign illustrated in FIG. 1.

In FIG. 1, an outdoor sign 22 is illustrated mounted on a trailer 24. It has a generator 26 and a battery 28 supported thereon. A plurality of L.E.D. light assemblies 20 are mounted on outdoor sign 22. In FIG. 2, a schematic electrical circuit is illustrated showing electrical conductors 30 and 32 connecting generator 26 and battery 28 to conductor 34 that is connected to each of the individual printed circuit boards 36 of the respective L.E.D. light assemblies 20. L.E.D.'s 38 are electrically connected together by a printed circuit on the boards 36.

Figure 3B:
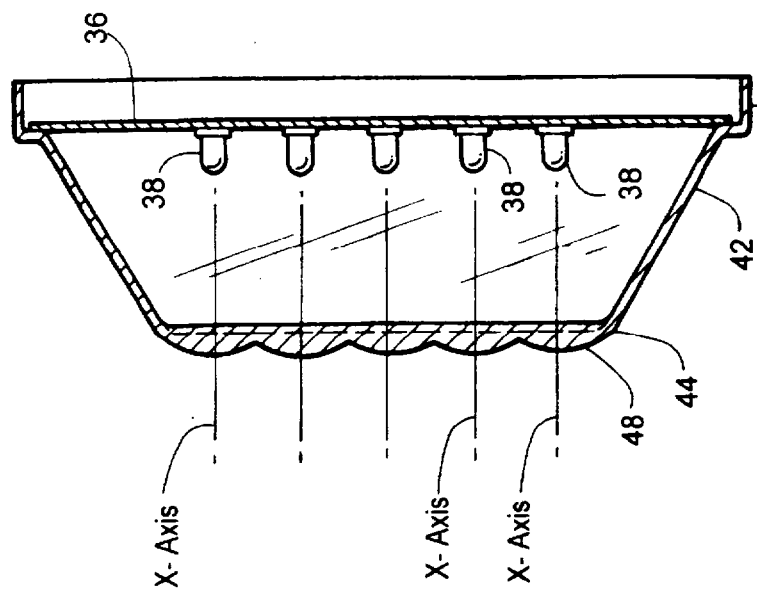
FIG. 3B is a right side elevation view of the novel L.E.D. light assembly illustrated in FIG. 3A.
Figure 3A:
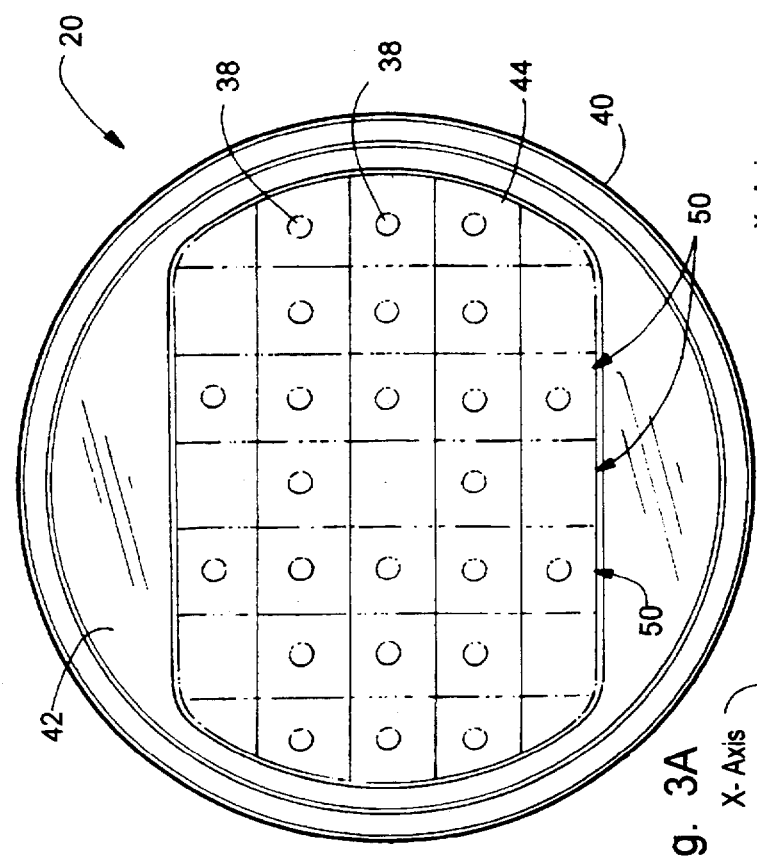
FIG. 3A is a front elevation view of the novel L.E.D. light assembly.
Figure 3C:
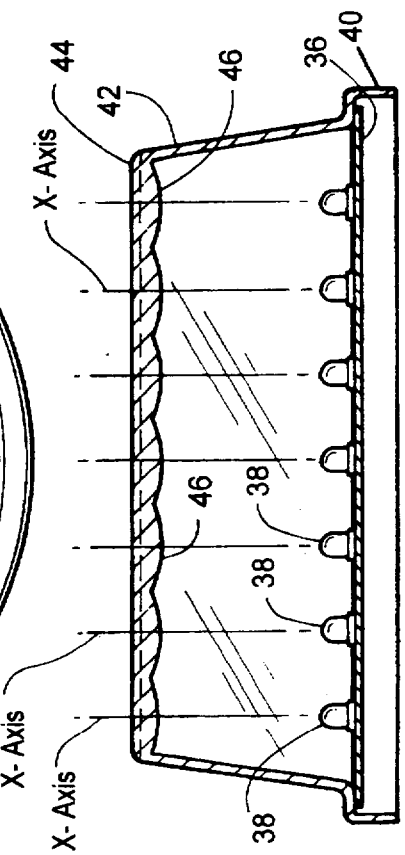
FIG. 3C is a top plan view of the L.E.D. light assembly illustrated in FIG. 3A.

FIGS. 3A–3C illustrate the novel L.E.D. light assembly 20. It has a base 40 that receives a circularly configured printed circuit board 36. Tapering forwardly from base 40 is lens housing 42 which is connected at its front end to lens 44. The base, lens housing and lens are all integrally formed from a plastic material. The rear surface of lens 44 has a plurality of vertical flutes 46. The front surface of lens 44 has a plurality of horizontal flutes 48. Each of the respective flutes has a left edge and a right edge and in viewing the lens from either its front or rear, the respective viewable intersecting left and right edges of the vertical flutes 46 and the horizontal flutes 48 define a grid of four sided magnifier modules 50 each having a height H2 in the range of ⅛"–⅝" and a width W2 in the range of ⅛"–⅝". Each of the light magnifier modules 50 have a horizontally oriented X-axis and the respective X-axes are substantially parallel to each other. The L.E.D.'s 38 each have a longitudinal axis that coincides with the X-axis of the respective light magnifier module behind which it is positioned.

FIGS. 4–6 are schematic views of lens 44. It has a width W1 and a height H1. In FIG. 4 the central core portion 60 of light magnifier modules 50 is utilized to provide a high intensity spotlight beam of light that is directed on the longitudinal axis of the L.E.D. light assembly 20. surrounding central core portion 60 is the surrounding portion 62 of light magnifier modules. These light magnifier modules disperse the light from the L.E.D. positioned on their respective X-axes and directs them along predetermined divergent horizontal angles and vertical angles.

FIGS. 7–9 are schematic illustrations of an alternative embodiment lens 45. It has pixels 47 positioned on the rear surface of the lens and these would be placed on light magnifier modules that do not have an L.E.D. positioned behind them on the printed circuit board.

Figure 11:
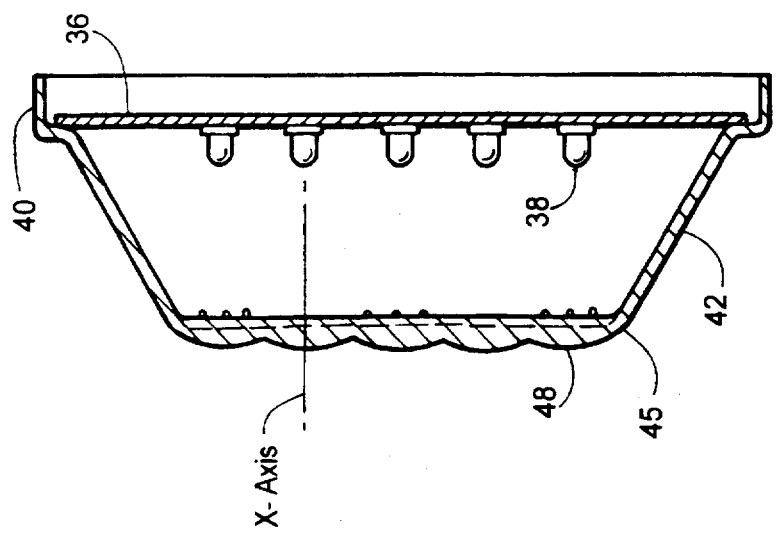
FIG. 11 is a right side elevation view of the L.E.D. light assembly illustrated in the FIG. 10.
Figure 10:
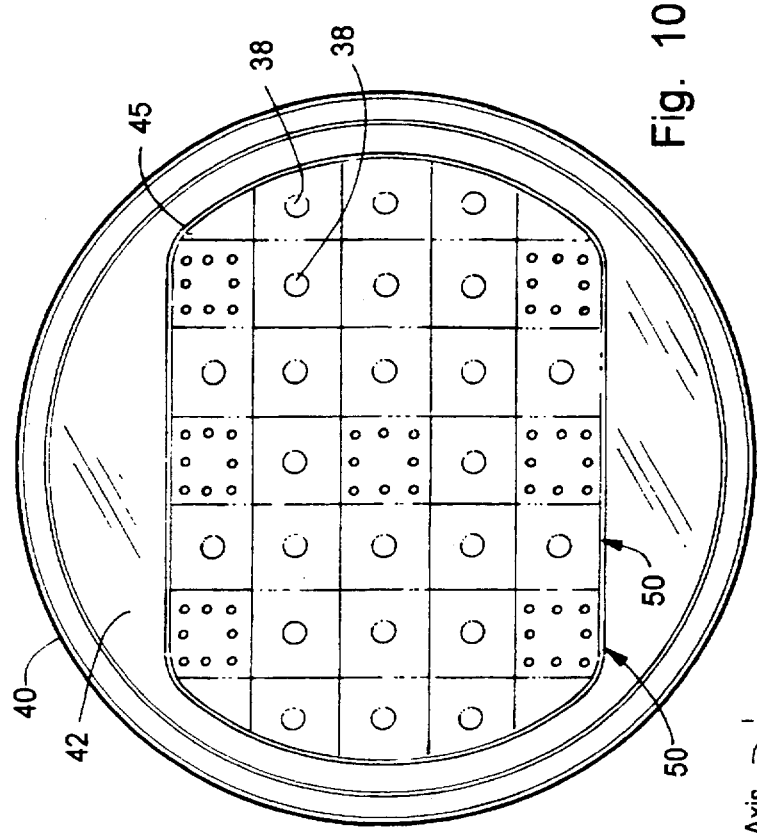
FIG. 10 is a front elevation view of a novel L.E.D. light assembly with the alternative embodiment lens with pixels on it.
Figure 12:
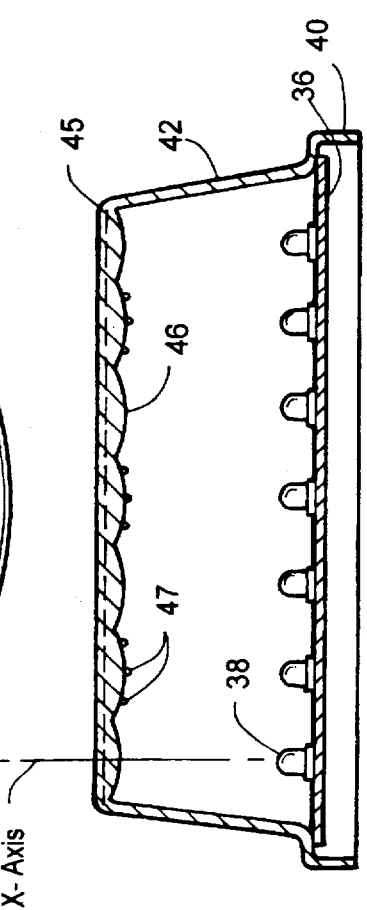
FIG. 12 is a top plan view of the L.E.D. light assembly illustrated in FIG. 10.

FIGS. 10–12 illustrate lens 45 in the L.E.D. light assembly 20.

Figure 13:
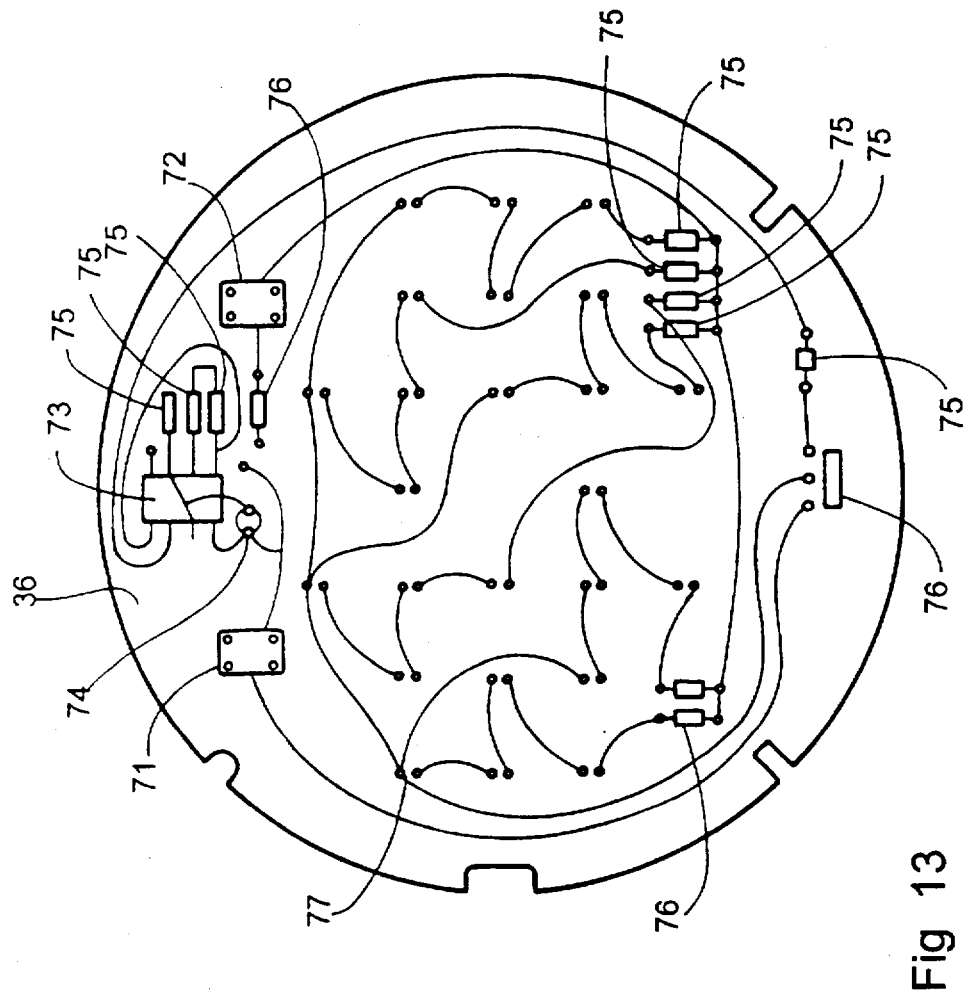
FIG. 13 is a rear elevation view of the printed circuit board.

FIG. 13 shows a printed circuit on printed circuit board 36. It has a pair of terminal brackets 71 and 72. Also shown are a time oscillator 73, a capacitor 74, resistors 75, a diode 76, and a mosfet 76. L.E.D. terminals 77 would receive the bottom ends of the L.E.D.'s that would be mounted on the other side of printed circuit board 36.

Figure 14:
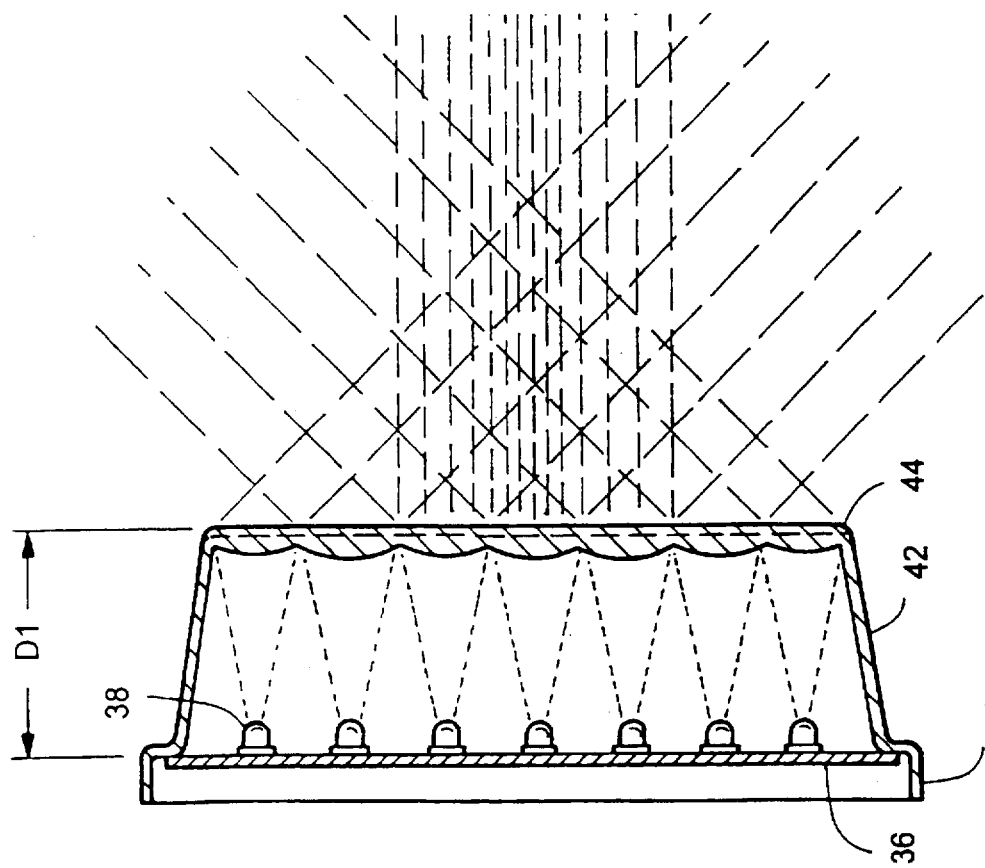
FIG. 14 is a schematic horizontal cross sectional view illustrating the manner in which the light rays from the L.E.D.'s are directed through the convex vertically oriented flutes.
Figure 15:
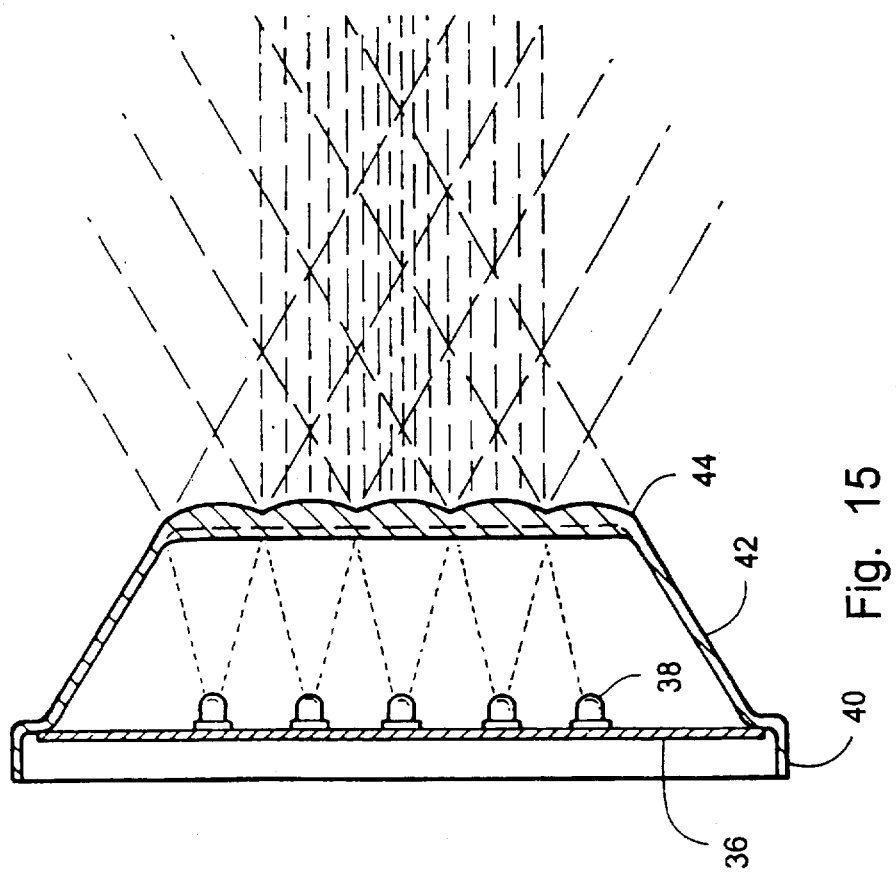
FIG. 15 is a schematic vertical cross sectional view illustrating the manner in which the light rays from the L.E.D.'s are directed through the convex horizontally oriented flutes.

FIG. 14 and FIG. 15 show the manner in which the light rays from the specific L.E.D.'s produce a central spotlight beam of light that passes along the longitudinal axes of L.E.D. light assembly 20. These Figures also show the manner in which the light from the surrounding L.E.D.'s pass through the light magnifier modules of surrounding portion 62 of the light magnifier modules. These light rays are dispersed both horizontally and vertically in a predetermined pattern.

What is claimed is:

1. An L.E.D. light assembly for traffic arrowboards comprising:

an upright oriented lens having a height H1, a width W1, a peripheral edge, a front surface and a rear surface; a plurality of adjacent vertical flutes each having a left edge and a right edge are formed on said rear surface and a plurality of adjacent horizontal flutes each having a left edge and a right edge are formed on said front surface; in viewing said lens from the front or rear of said lens, the respective viewable intersecting left and right edges of said vertical flutes and said horizontal flutes define a grid of light magnifier modules; said grid has a central core portion of light magnifier modules and a surrounding portion of light magnifier modules; said light magnifier modules each having a height H2 and a width W2; said light magnifier modules each having an axially extending substantially horizontal X-axis and said X-axes are substantially parallel to each other;

an upright oriented base having a front end;

a housing having a front end and a rear end; said rear end being connected to said base and said front end being connected to said lens;

an upright oriented printed circuit board that is mounted in said base; said printed circuit board having a front surface that is positioned a distance D1 behind said lens and D1 is in the range of ¾"–2½"; said X-axes of said light magnifier modules extend rearwardly to said front surface of said printed circuit board; several L.E.D.'s each having a longitudinally extending axis are mounted on said front surface of said printed circuit board and said longitudinal axes substantially coincide with said respective X-axes of said light magnifier modules of said lens; there is an L.E.D. on most of said X-axes of said central core portion of magnifier modules of said lens and there is an L.E.D. on most of said X-axes of said surrounding portion of magnifier modules on said lens;

said light magnifier modules of said central core portion having means for projecting axially forwardly a spotlight beam of light having an intensity in the range of 600–1000 candelas;

said light magnifier modules of said surrounding portion of light magnifier modules having means for dispersing light rays in a pattern having a vertical angulation in the range of 0–15 degrees and a horizontal angulation in the range of 0–30 degrees, said light intensity of said surrounding portion of light magnifier modules being in the range of 200–800 candelas.

2. An L.E.D. light assembly for traffic arrowboards as recited in claim 1 wherein H2 is in the range of $\frac{3}{8}"-\frac{5}{8}"$ and W2. is in the range of $\frac{3}{8}"-\frac{5}{8}"$.

3. An L.E.D. light assembly for traffic signals and arrowboards as recited in claim 1 wherein W1 is greater than H1 and said lens is substantially rectangular shaped.

4. An L.E.D. light assembly for traffic arrowboards as recited in claim 1 wherein W1 is greater than H1 and said lens has a substantially oval shape.

5. An L.E.D. light assembly for traffic arrowboards as recited in claim 1 wherein said lens housing tapers in size from its rear end to its front end.

6. An L.E.D. light assembly for traffic arrowboards as recited in claim 1 wherein H1 is in the range of 2"–4½" and W1 is in the range of 2½"–6½".

7. An L.E.D. light assembly for traffic arrowboards as recited in claim 1 wherein said base, said lens housing and said lens are integrally formed of plastic material.

8. An L.E.D. light assembly for traffic arrowboards as recited in claim 7 wherein said base is a round PAR 46 base.

9. An L.E.D. light assembly for traffic arrowboards as recited in claim 7 wherein said base is a round PAR 36 base.

10. An L.E.D. light assembly for traffic arrowboards as recited in claim 1 wherein said vertical flutes have a convex shape to spread the light from the L.E.D.Is positioned behind said lens in a horizontal pattern.

11. An L.E.D. light assembly for traffic arrowboards as recited in claim 1 wherein said vertical flutes have a concave shape to spread the light of the L.E.D.'s positioned behind said lens in a vertical pattern.

12. An L.E.D. light assembly for traffic arrowboards as recited in claim 1 further comprising pixels extending rearwardly from the rear surface of some of said light magnifier modules to advance the optics at a close range and diminish the viewing range at a greater distance.

13. An L.E.D. light assembly for traffic arrowboards as recited in claim 1 wherein said vertical flutes have a convex shape to spread the light from the L.E.D.'s positioned behind said lens in a horizontal pattern.

14. An L.E.D. light assembly for traffic arrowboards as recited in claim 1 wherein said horizontal flutes have a concave shape to spread the light from the L.E.D.'s positioned behind said lens in a vertical pattern.

15. An L.E.D. light assembly for traffic arrowboards as recited in claim 12 wherein said pixels are on light magnifier modules that don't have an L.E.D. behind them on their X-axis.

* * * * *